United States Patent [19]
Frobenius et al.

[11] 4,044,234
[45] Aug. 23, 1977

[54] PROCESS AND APPARATUS FOR CONTROLLING ENGINE OPERATION NEAR THE LEAN-RUNNING LIMIT

[75] Inventors: Wolf-Dietrich Frobenius, Asperg; Hartmut Schweizer, Korntal, both of Germany

[73] Assignee: Robert Bosch GmbH, Stuttgart, Germany

[21] Appl. No.: 659,493

[22] Filed: Feb. 19, 1976

[30] Foreign Application Priority Data

Feb. 19, 1975 Germany .............................. 2507138

[51] Int. Cl.$^2$ ......................... G06F 15/20; F02D 5/00
[52] U.S. Cl. ........................... 235/150.21; 123/32 EA
[58] Field of Search .............. 235/150.21; 123/32 EA, 123/32 AE

[56] References Cited

U.S. PATENT DOCUMENTS

| | | | |
|---|---|---|---|
| 3,789,816 | 2/1974 | Taplin et al. | 123/32 EA X |
| 3,820,198 | 6/1974 | Scofield | 123/32 EA |
| 3,863,054 | 1/1975 | Monpetit | 235/150.21 |
| 3,927,304 | 12/1975 | Wentworth et al. | 235/150.21 |
| 3,953,716 | 4/1976 | Monpetit | 235/150.21 |

*Primary Examiner*—Jerry Smith
*Attorney, Agent, or Firm*—Edwin E. Greigg

[57] ABSTRACT

The fuel supply control pulses of an internal combustion engine may be shortened or lengthened to provide operation of the engine at a definite fuel-air ratio. When operation takes place in a leaned-out region, the engine suffers dynamic instability, resulting in rapid fluctuations of the rotational crankshaft velocity, superimposed on regular, periodic changes due to compression changes.

The maximum and minimum crankshaft speeds are measured at two different locations of the angular path by passing markers in front of an inductive transducer. The output signals from this transducer are fed to a gating circuit which controls the counting modes of a digital counter which is also supplied with a clocking pulse train at a constant, high frequency. The gating circuit causes alternate upward and downward counting in the counter so that a net difference of counted pulses is formed after each two successive counting periods. This difference is stored until a particular piston of the engine has returned to the functional position it occupied during the first measurement. The measurement is repeated and the difference between the two measurements is compared. The result of this comparison forms a measure of engine roughness and is used for fuel control.

10 Claims, 2 Drawing Figures

PROCESS AND APPARATUS FOR CONTROLLING ENGINE OPERATION NEAR THE LEAN-RUNNING LIMIT

BACKGROUND OF THE INVENTION

The invention relates to a process and to an apparatus for the acquisition of operational data levels heralding the imminent approach to a given pre-determined upper lean-running limit during the operation of an internal combustion engine, specifically for the regulation of the internal combustion engine within the region of excess air, ($\lambda > 1$).

At the present time, increased efforts are directed to permit internal combustion engines to function within preferably that operating range where the quantity of the harmful components of the exhaust gases can be kept small, and/or where the fuel consumption can be kept low, in order to meet the ever more stringent environmental rules regarding engine exhaust gases, and to respond to the challenge of the general shortage of fuel.

These requirements may be met by supplying the internal combustion engine with a comparatively lean fuel-air mixture, i.e., to tend toward combustion engine settings in the direction of a lean mixture, since operation in that region assures exhaust gases which are relatively free of harmful substances, and also assures low rates of fuel consumption. The precise determination of the operational point constituting the upper limit of the lean-running region is, therefore, of substantial significance, in order that the internal combustion engine may be operated under the constraint of the maximum admissible value, which differs for different engine rpm. As a result, it is of substantial significance that the operational point constituting the limit of the lean-running region be very accurately determined, and this determination can be based, for example, upon the fluctuations in the cyclic pressure patterns in the individual cylinders of the internal combustion engine. It is known that the dynamic stability (smoothness) of an internal combustion engine suffers, and become proportionately more disturbed, as one departs from an approximately stoichiometric relationship ($\lambda = 1$). In the present case, only the departure which is in the direction of the region of excess air ($\lambda > 1$) has any substantial significance. The numerical air-quantity $\lambda$ thus exerts a powerful influence upon the operation and the exhaust gas composition of Otto-engines in particular, and of internal combustion engines in general. One device which has become commonly known, and which may be called a $\lambda$-probe, succeeds in monitoring the delivered fuel-air mixture whenever $\lambda = 1$, through the analysis of the composition of the exhaust gases of the engine, but due to the technical characteristics of the $\lambda$ - probe, this monitoring process is admittedly feasible only at this one single value ($\lambda = 1$). The conditions relevant to the emission of harmful exhaust-gas components (CO, HC, NOx), become substantially more favorable, as was already indicated earlier, when one manages to continue to operate the engine in the lean region, i.e., in a region which cannot, however, be surveyed with any precision by the $\lambda$-probe. Such a continued lean operation of the combustion engine also results in the saving of fuel. It is rather difficult, however, to determine and measure the momentary $\lambda$ -values when $\lambda$ is greater than 1, that is, when the combustion engine is operated in the region of air excess. However, if the instantaneous air flow rate is known, a given, desired $\lambda$-value can be obtained by a corresponding measured allocation of the fuel. Yet this scheme necessitates additional and continuous measurements, and, besides, the combustion process plays a decisive role in the use of the fuel, and, consequently, in the generation of the driving torques and the products of combustion. The present invention is based on the recognition that it should be feasible to monitor the combustion process and, thus, to measure the approach to a given desired value of $\lambda$ in the region of air excess, at least indirectly, since the required information is contained in a dynamic variable which is a function of the combustion process. In a particular instance, the combustion process is monitored via the variation occurring in the speed changes $\Delta \omega$ of the crankshaft, i.e., through the measurement of the variation of the rotational speed of the crankshaft.

When one approaches the operational limits within the region of air excess, strong fluctuations are produced in the ignition delay and in the combustion behavior, such that the charge cannot be completely combusted in some of the individual power cycles. Moreover, combustion may fail to occur altogether, if ignition was not supplied prior to top dead center. If one succeeds in the early recognition of such retarded or incomplete combustions, then one can derive therefrom the data needed for the precise regulation and control of the internal combustion engine at a still-admissible $\lambda$ -values within the region of air-excess.

To clarify these matters, FIG. 1 depicts the curve I of the normal compression pressure of a combustion engine, having four cylinders in the example of the present embodiment, plotted over an axis corresponding to the respective angular position of the crankshaft. It may be seen that the pressure rises at or near zero degrees, i.e., as the piston approaches its top dead center, and that work must be expended to continue the motion past top dead center. The same thing happens at a crankshaft angle of 180°, when another piston of the four-cylinder engine reaches its top dead center. A graph of this kind may be obtained from a four-cylinder combustion engine by shutting off the ignition, or by interrupting the fuel delivery, and by cranking the engine with the starter.

During normal engine operation, that is to say, when both the fuel-air mixture and the ignition are supplied, a further pressure-surge takes place in the corresponding cylinder after a given piston moves through its top dead center, as portrayed by curve II in FIG. 1. The curves in FIG. 1 are merely qualitative; the pressure surge is due to fuel combustion and exerts a turning moment (torque) on the crankshaft. Thereafter, the rpm drops due to energy losses. The crankshaft's rotational velocity $\omega$, represented by curve III in FIG. 1, is a function of the power strokes of the internal combustion engine. The curve III shows that the rotational velocity of the crankshaft is subject to cyclic fluctuations; the magnitude of the rotational velocity $\omega$ is lowest (Region T1) before and during a given piston's arrival and presence at the top dead center position, whereas it is highest in the region T2, and continually decreases thereafter until the sequentially next piston arrives at its top dead center, in another cylinder. Since a four-cycle, four-cylinder internal combustion engine yields two power-strokes for each single revolution of the crankshaft, FIG. 1 accurately reflects the corresponding periodic $\omega$-fluctuations of the crankshaft. As noted, these periodic fluctuations are functions of the rotating masses, and of the cyclic power sequences of the individual cylinders, whereby, as may be easily deduced, the amplitude of these periodic ω-fluctuations decreases as the engine speed (rpm) increases, since the power strokes occur ever more frequently, thus leaving less and less time for any reduction in the rotational velocity of the crankshaft. It is to be noted here, however, that this particular decrease of the ω-fluctuations shown in FIG. 1 is not linear. The periodic ω-fluctuations are at a given engine rpm and also occur when λ is approximately equal to 1. Thus, the rpm oscillates about a mean value.

When the operating conditions of the combustion engine approach the operational limit within the region of excess air, (lean-running limit), strong fluctuations are produced in the ignition delay and in the combustion behavior which, in turn, cause momentary fluctuations in the angular speed of the crankshaft. Thus, in addition to the aforementioned periodic ω-fluctuations, further irregular ω-fluctuations occur, resulting in a more complex influence on the dynamic behavior of the rotational velocity of the crankshaft. Solely for those operational conditions where λ is approximately equal to 1, and where the combustion progresses essentially uniformly and without delay, do the periodic ω-fluctuations predominate; the farther one enters into the region of excess air, the more do the irregular fluctuations outweigh the periodic fluctuations, i.e., the more erratic is the running of the internal combustion engine. The invention permits derivation of a signal which is representative of this erratic running of the engine, and this signal can be employed in the regulation and control of a particular operating point of the combustion engine.

During the approach to the lean-running limit, as the combustion becomes retarded, the value Δω, or the differential-value between $\omega_{min}$ and $\omega_{max}$, becomes conspicuously smaller, and the oscillations of the rotational velocity, or rpm, i.e., of ω about the mean value diminish accordingly and the invention exploits this phenomenon.

OBJECT AND SUMMARY OF THE INVENTION

Thus, it is a principal object of the present invention to extract signals from the progressively more erratic running condition of the internal combustion engine as the engine reaches the lean-running limit. These signals may be employed as feedback signals, and used as the control variables for the composition of the fuel-air mixture.

This object is attained, according to the invention by proceeding beyond the process cited above, and by measuring two paired cyclical values $\omega_{min}$, $\omega_{max}$, whose magnitudes are functions of the combustion process, preferably functions of the rotational velocity ω of the crankshaft, and by forming a difference $\omega_{min} - \omega_{max}$ which is fed to a storage element. The stored value is then compared with another, corresponding value, derived from the same cylinder of the engine at a later point in time. The result is compared with a set-point value and is employed in the regulation of the fuel-air mixture delivered to the combustion engine.

In this manner, one obtains advantageously useful and exploitable signals, from which the instantaneous operating condition of the combustion engine, in particular the approach to the engine's lean-running limit, may be determined, all without cumbersome measurements and without having to examine the exhaust gases of the engine.

The invention will be better understood, as well as further objects and advantages will become more apparent, from the ensuing detailed specification of a preferred, although exemplary, embodiment of the invention taken in conjunction with the drawing.

DESCRIPTION OF THE PREFERRED EMBODIMENT

Figure 1:
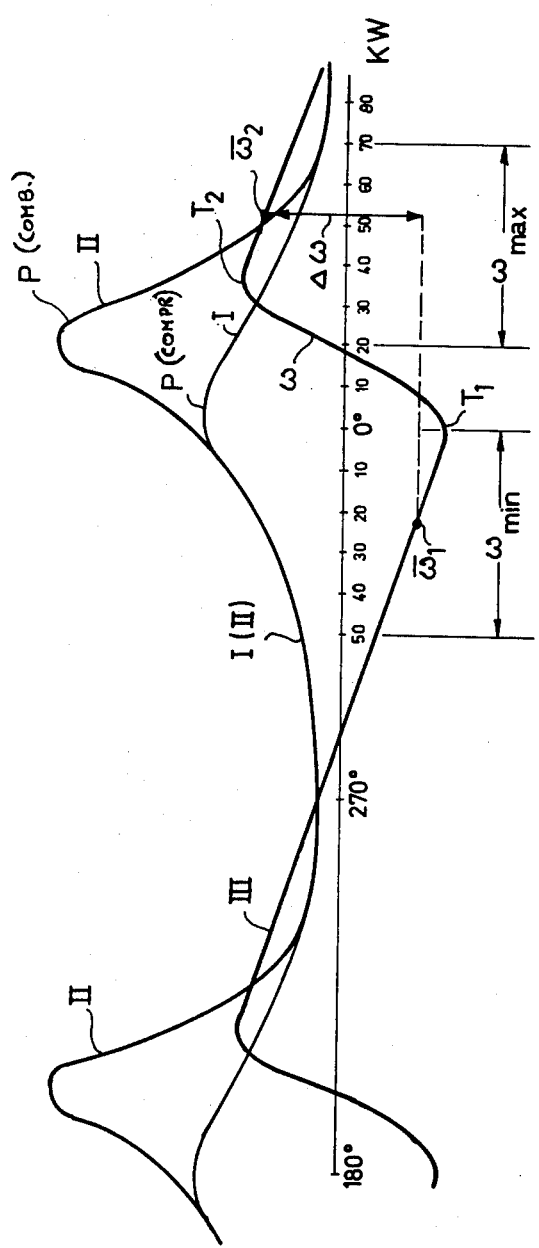
FIG. 1 is a set of curves showing the rotational velocity of the crankshaft and the pressure in the cylinder, respectively, as a function of the angular position of the crankshaft in a four-cylinder combustion engine.

A detailed elaboration of FIG. 1 is thought unnecessary, since it has already been given above. However, it should be added that, in those aspects where the data in FIG. 1 re quantitative, they relate to conditions in a four-cylinder engine, as do the illustrated curves, plotted against angle. It should be understood that, for an internal combustion engine having a number of cylinder other than four, the basic relationship of the curves remains unchanged, but the relative angular crankshaft position would undergo a corresponding shift. The four-cylinder machine, chosen for the preferred embodiment, features two power strokes for each revolution of the crankshaft, so that, in FIG. 1, the pronounced vertical excursions of the plotted curve of the rotational velocity ω of the crankshaft, beginning approximately at 50° before top dead center, and extending to approximately 80° beyond top dead center, correspond to a typical one of the four cylinders of the engine.

As a first step in the embodiment of the invention, the magnitude of the cyclical fluctuation $\Delta\omega = \omega_{min} - \omega_{max}$ is determined. Since the values $\omega_{min}$ and $\omega_{max}$ are measured in a finite interval, they are average values. During the approach to the lean-running limit, the change, or variation, in the rotational velocity of the crankshaft from $\omega_{min}$ to $\omega_{max}$, henceforth designated as Δω, itself increasingly experiences changes with respect to a preceding value of Δω.

In order to exclude from the intended measurement the effects of any mechanical, physical, or dimensional differences (valve-clearance, ignition timing, compression ratio, etc., among the several cylinders of an internal combustion engine, the invention provides that the comparison of any one value of Δω with another value of Δω will involve only Δω-values from any one, given, cylinder. These values are obtained, in each case, in two successive cycles of the engine. The Δω value is obtained, as already indicated, from 2 measurements of ω, one prior to the top-dead-center ($\omega_{min}$), and a second one after the occurrence of the maximum pressure ($\omega_{max}$). The angles over which the measurements of $\omega_{min}$, $\omega_{max}$ are conducted, are preferably identical, and can be furnished, for example, by counting a certain given number of teeth on the conventional starter ring gear of internal combustion engines equipped with them. The principle of measurement, according to the invention, consists basically in the execution of a double subtraction, namely once for the formation of the value of Δω from the difference of $\omega_{min} - \omega_{max}$, and once again for the correlation of this just obtained value of Δω with another Δω, similarly obtained, during a consecutive, combustion cycle in the same given cylinder. The final value, which is then employed in the comparison with a reference value, is formulated, therefore, as $\Delta(\Delta\omega) = \Delta\omega_1 - \Delta\omega_2$ where $\Delta\omega_1$ is, in each case, the earlier and $\Delta\omega_2$ is, in each case, the later measurement in the same given cylinder. With the aid of this differential measurement principle, mechanical, physical, or dimensional inaccuracies of the ring-gear, and inaccuracies attributable, therefore, to eccentricities and other similar characteristics, are effectively excluded from the measurement. Similarly, the influence of wear and tear upon the ring-gear is equally of little detriment to the measurement as is a fault in the transducer (possibly delay), as these two influences are also excluded from the measurement through the differential measurement principle.

Figure 2:
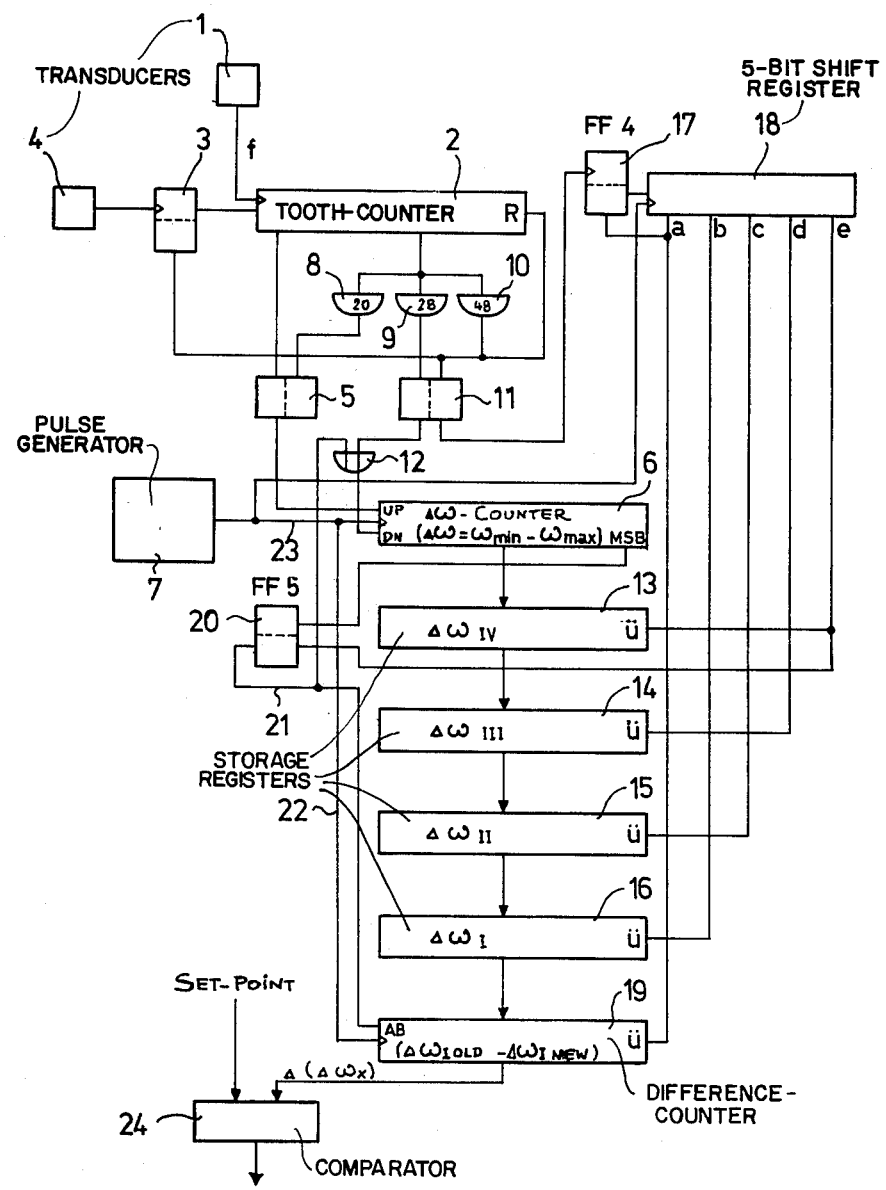
FIG. 2 is a partially schematic diagram of a preferred embodiment of the apparatus of the invention.

FIG. 2 depicts one possible and preferred embodiment of the apparatus of the invention for carrying out the process described above.

A transducer 1, for example a ring gear transducer, is attached to a member, not shown, preferably the starter ring gear, which turns with the crankshaft of the internal combustion engine. The transducer 1 feeds a pulse to a subsequent tooth-counter 2, whenever a gear tooth moves past the transducer. A preceding bistable switching element, for example, a flip-flop 3, turns the counter 'on'. The flip-flop 3 is 'set', by the arrival of a start-marker, which determines, in each case, the start of the counting process of the tooth-counter 2.

To illustrate, and as shown in FIG. 1, the first $\omega$-measurement lasts from 50° before top dead center until top dead center, and the second $\omega$-measurement lasts from 20° - 50° after top dead center. In order to synchronize the system, a transducer 4, generating a 360° signal or two 180° signals, is required. In the preferred embodiment, two 180° markers are used; one of these markers occurs at 50° before top dead center. The placement of these two 180° markers needs also not to be extremely accurate, due to the already-mentioned differential measurement principle.

When the tooth-counter is turned on by the first start-marker, the front edge of the next tooth puts a '1' into the tooth-counter, and a subsequent flip-flop 5 is also put into the set position, by the content of the LSB (least significant bit). With each subsequent, consecutive, tooth, the content of the tooth-counter 2 is increased by one unit. Concurrent with setting the flip-flop 5, a $\Delta\omega$-counter 6 is turned on, and so counts the pulses of a pulse-generator oscillating at a relatively high frequency (approximately 1 MHz), from zero or upward.

If it is assumed, for example, that a 50° crankshaft angle corresponds to 20 teeth of the starter-ring-gear of the given combustion engine, then the flip-flop 5 must be reset and the $\Delta\omega$ counter 6 turned 'off', when the tooth-counter 2 reaches a count of 20. To this end, the gating circuits 8, 9 and 10 are connected to appropriate counting outputs of the tooth-counter 2, and are turned on and issue corresponding control signals, when, in each case, predetermined counter-position values are reached, namely, 20 for the gate-circuit 8, 28 for the gate-circuit 9, and 48 for the gate-circuit 10. The reset pulse for the flip-flop 5 arrives via the gate-circuit 8 after the tooth-counter 2 has counted 20 teeth, thus the $\Delta\omega$-counter 6 is turned off by the flip-flop 5.

After 8 additional teeth pass by, i.e., when the count is 28, another flip-flop 11 is set by the gate-circuit 9, and, via an OR-gate 12, turns the $\Delta\omega$-counter 6 on, so that the counter 6 begins to count the constant frequency pulse from the pulse generator 7 in a downward, or backward, counting direction. After an additional 20 teeth pass by, the gate-circuit 10 responds, and thereby resets the flip-flop 11. This event interrupts the downward-counting of the counter; the signal from the gate-circuit 10 thus constitutes the resetting signal for tooth-counter 2 and also for the initial flip-flop 3. Since, as may be seen from FIG. 1, the second $\omega$-value, i.e., $\omega_{max}$, will be larger, (the rotational velocity of the crankshaft is higher, and consequently the time-interval needed by the second set of 20 teeth to move past the transducer is shorter), the remainder left in the $\Delta\omega$-counter, after the count 48 has been reached, will be positive.

The system remains in this state until, in a four-cylinder engine, the second 180° marker triggers the cycle anew, at which time a further $\Delta\omega$ value, corresponding now to a different cylinder, is determined in the same manner as before. However, the respective measured $\Delta\omega$-values for the individual cylinders will, in a four-cylinder-engine, each be transferred, sequentially, to four storage registers 13, 14, 15, and 16, which are connected downstream of the $\Delta\omega$-counter 6. For this purpose, after the computation of each $\Delta\omega$-value is completed, and concurrent with the resetting of the flip-flop 11, a further flip-flop 17 is set. As a consequence, (in the preferred embodiment of a four-cylinder engine) a 5-bit shift-register 18 is triggered. The counting input of the shift-register 18 is connected to the output line of the pulse generator 7. The following events take place: The first pulse at the output $a$ of the shift-register transfers the contents of the storage-register 16, namely $\omega_I$, (the Roman numeral subscripts refer, respectively, to the corresponding engine cylinders) to a subsequent, difference-counter 19, described below, and also resets the flip-flop 4, which then prevents a renewed cyclic propagation of the shifting pulse. The pulse from the output $b$ of the shift-register transfers the contents of the storage-register 15 to the register 16, etc. This transfer of data between adjacent storage-registers continues until the output $d$ of the shift-register transfers the content of register 13 to register 14. Thus, the register 13 is cleared of data and is ready for the reception of the next new value of $\Delta\omega$ from cylinder I. It will be clear that the number of storage-registers is equal to the number of cylinders of the particular internal combustion engine. Furthermore, after all the registers 13–16 have been filled with data, two values of $\Delta\omega$, corresponding to the same cylinder, are contained concurrently in the $\Delta\omega$-counter 6.

Finally, it is necessary to obtain the difference between the earlier value of $\Delta\omega$ and the new value of $\Delta\omega$ (of course, also for all the other cylinders in the appropriate sequences). The last pulse from the shift-register 18, at the output $e$ serves to transfer the new value of $\Delta\omega$ from the counter 6 to the register 13, and, at the same time sets a flip-flop 20, whose output line 21 then carries a signal to both the difference-counter 19 and the counter 6. This signal causes both counters to count the pulse-sequence from the pulse-generator 7, received via line 22, and 23 respectively, in a downward-counting mode. Both counters, 6 and 19, each of which, as already stated, contains a $\Delta\omega$-value, representing, respectively, the new, and the old, measurement, in the same cylinder, is now made to count downward at the rate of the pulse-generator frequency, until the $\Delta\omega$-counter 6 counts past the zero position. At that moment, the alteration of its MSB (most significant bit) once again resets the flip-flop 20. During the last described counting process, the difference-counter 19 forms the value $\Delta(\Delta\omega_X)$ i.e., the difference of $\Delta\omega_{X\ old} - \Delta\omega_{X\ new}$ This difference can be positive or negative; it is fed to a comparator 24, which, via another input, receives an adjustable, digital, reference-value. The comparator issues a signal whenever the measured value $\Delta(\Delta\omega_x)$ exceeds the particular reference-value. The comparator thus provides a control signal which is fed to a regulator, not shown. This control signal can, for example, be conducted via an integrator-element, preferably to the multiplier-stage of the controller of an electronic fuel-injection system, where it produces an elongation or abbreviation of the injection-impulses $t_i$ for all the cylinders of the combustion-engine.

The foregoing is a preferred but merely exemplary embodiment of the invention and numerous variants thereof are possible within its scope which is defined by the appended claims.

What is claimed is:

1. A process for obtaining a signal for controlling an internal combustion engine, said engine including a rotating crankshaft, and cyclically moving piston means, comprising the steps of:

obtaining a first datum related to the speed of rotation of said crankshaft at a first angular position and obtaining a second datum related to the speed of rotation of said crankshaft at a second angular position;

forming and storing a first arithmetic difference between said first and second datum;

repeating the step of obtaining a first and a second datum related to the speed of rotation of said crankshaft, during a subsequent revolution thereof, and at the same position of said piston means;

forming a second arithmetic difference between the first and second datum obtained during said subsequent revolution of the crankshaft;

comparing said first difference with said second difference and obtaining a result;

comparing said result with a predetermined set-point value and obtaining a second result from which said signal for controlling the engine may be derived.

2. A process as defined by claim 1, wherein the step of obtaining a first and second datum is performed by gating a digital counter which is clocked at a constant frequency in one arithmetic sense to obtain said first datum and in the opposite arithmetic sense to obtain said second datum.

3. A process as defined by claim 2, further comprising the steps of generating signals from the motion of regular serrations in a rotating member of said crankshaft, counting said signals and using the total of said counted signals to gate said digital counter.

4. A process as defined by claim 3, comprising the further steps of storing said first difference in digital storage means at least until said second difference is present in said digital counter at the same overall position of said piston means whereupon said first and second differences are both counted by subtraction with a high frequency pulse train.

5. An apparatus for providing a signal for controlling an internal combustion engine, said engine including a rotating crankshaft and a fuel supply system, comprising:

marker means moving in step with the cyclic motion of said crankshaft;

transducer means, for cooperation with said marker means to generate inductively a datum related to the rotational speed of said crankshaft;

frequency generator means, for generating a pulse train of constant frequency;

first counter means, clocked by said pulse train and gated by said datum;

means for defining the sense of counting of said counter means to provide for alternate counting in an arithmetically additive and subtractive sense, thereby forming a difference of successive values of crankshaft speed;

a number of storage registers for storing said difference obtained in successive measurements, said number being equal to the number of engine cylinders.

6. An apparatus as defined by claim 5, wherein said marker means are associated with the starter ring gear of the engine and further comprising a tooth counter receiving the datum from said transducer means the output of said tooth counter being connected to said means for defining the sense of counting of said counter means.

7. An apparatus as defined by claim 6, further comprising logical gate circuits whose inputs are connected to the output of said tooth counter and also comprising two flip-flop circuits connected to the output of said gate circuits and controlling the sense of counting of said first counter means.

8. An apparatus as defined by claim 7, wherein one of said flip-flops is set by the LSB of said tooth counter and reset when said tooth counter reaches the count of 20 and determines the duration of up-counting in said first counter means and wherein said second flip-flop is set when the count in said tooth counter is 28 and is reset when the count in said tooth counter is 48 and determines the duration of downward counting of said first counter means, said apparatus further comprising a shift register controlled by the output signal of said second flip-flop and connected to take over and shift the pulse train from said frequency generator means, said apparatus further comprising a plurality of storage registers connected in cascade triggered by the output of said shift register for transferring the contents from said first counter means sequentially through said storage registers and also comprising second counter means connected downstream of the last of said storage registers.

9. An apparatus as defined by claim 8, further comprising a third flip-flop controlled by one of the outputs of said shift register and connected to said first counter means and to said second counter means to initiate therein a downward counting sequence of the pulses in the pulse train of said frequency generator means.

10. An apparatus as defined by claim 9, wherein the MSB position of the first counter means is connected to the reset input of said third flip-flop thereby controlling the termination of the simultaneous downward counting in said first and second counter means, and further comprising a comparator circuit connected to receive the contents of said second counter means for comparison with an adjustable set point value whereby said comparator circuit generates an output control signal which may be used in adjusting the length of fuel injection control pulses in said fuel supply system.

* * * * *